United States Patent [19]

Bracken et al.

[11] Patent Number: 5,585,679
[45] Date of Patent: Dec. 17, 1996

[54] ONE-PIECE MAGNET RETURN PATH ASSEMBLY FOR A DISK DRIVE ACTUATOR

[75] Inventors: Allen T. Bracken, Layton; Edward L. Rich, Ogden, both of Utah; Ted R. Davis, Oklahoma City, Okla.

[73] Assignee: Iomega Corporation, Roy, Utah

[21] Appl. No.: 450,691

[22] Filed: May 25, 1995

[51] Int. Cl.⁶ .................... H02K 41/02; G11B 33/00
[52] U.S. Cl. .................................. 310/13; 360/106
[58] Field of Search ........................... 310/12, 13, 14; 360/104, 105, 106

[56] References Cited

U.S. PATENT DOCUMENTS

| | | | |
|---|---|---|---|
| 4,443,775 | 4/1984 | Fujitani et al. | 335/281 |
| 5,025,336 | 6/1991 | Morehouse et al. | 360/97.02 |
| 5,235,482 | 8/1993 | Schmitz | 360/97.02 |
| 5,295,031 | 3/1994 | Wasson | 360/106 |
| 5,313,124 | 5/1994 | Macpherson | 310/13 |
| 5,345,206 | 9/1994 | Morcos | 335/222 |
| 5,369,538 | 11/1994 | Moe et al. | 360/106 |

Primary Examiner—Steven L. Stephan
Assistant Examiner—Judson H. Jones
Attorney, Agent, or Firm—Woodcock Washburn Kurtz Mackiewicz & Norris

[57] ABSTRACT

A one-piece magnet return path assembly for a disk drive actuator comprises an upper plate, a lower plate and a plurality of standoffs extending between the upper and lower plates and establishing a pre-determined spacing between the plates. The upper and lower plates and the plurality of standoffs are stamped from a single sheet of magnetically permeable material that is then bent at predetermined locations to form the completed one-piece magnet return path assembly.

10 Claims, 3 Drawing Sheets

ONE-PIECE MAGNET RETURN PATH ASSEMBLY FOR A DISK DRIVE ACTUATOR

BACKGROUND

1. Field of the Invention

The present invention relates to data storage devices, or disk drives, for storing digital information, and more particularly, to a one-piece magnet return path assembly for a voice coil motor in a disk drive.

2. Description of the Prior Art

Disk drives often employ voice coil actuators for positioning the read/write heads of the disk drive over the surfaces of a disk-shaped storage media. Magnetic flux for the voice-coil motor is typically generated by a magnetic circuit comprising a return path assembly and a pair of magnets. The return path assembly is usually comprised of a top plate, a bottom plate, and a plurality of standoffs. The standoffs hold the top and bottom plates apart at a predetermined distance to form an air gap for receiving a coil coupled to one end of the actuator. Magnets are typically bonded to the inner walls of both the top and bottom plates. The top and bottom plates, along with the standoffs, form a flux return path for a magnetic field generated by the top and bottom magnets. The magnetic flux within the air gap between the magnets induces torque on the actuator in response to an electric current in the actuator coil.

In prior art disk drives of the type described above, the top and bottom plates and the standoffs are formed separately from a magnetically permeable material, such as a low carbon steel. These separate components are then assembled together using suitable hardware. U.S. Pat. No. 5,313,124 discloses such a prior art return path assembly.

Unfortunately, these prior art return path assemblies increase the assembly time and manufacturing costs of a disk drive, since the various components must be purchased separately, along with suitable hardware, and then assembled together in the disk drive. There is a need, therefore, for a more cost-effective magnet return path assembly for a disk drive that overcomes the disadvantages of prior art assemblies. The present invention satisfies this need.

SUMMARY OF THE INVENTION

The present invention is directed to a one-piece magnet return path assembly for a disk drive actuator. The one-piece magnet return path assembly comprises an upper plate, a lower plate and a plurality of standoffs extending between the upper and lower plates and establishing a predetermined spacing between said upper and lower plates. The upper and lower plates and the plurality of standoffs are stamped integrally from a single sheet of magnetically permeable material. The blank is then bent at predetermined locations to form the completed one-piece magnet return path assembly. Preferably, the magnetically permeable material comprises a low carbon steel. The one-piece assembly of the present invention reduces costs and assembly time in a disk drive.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
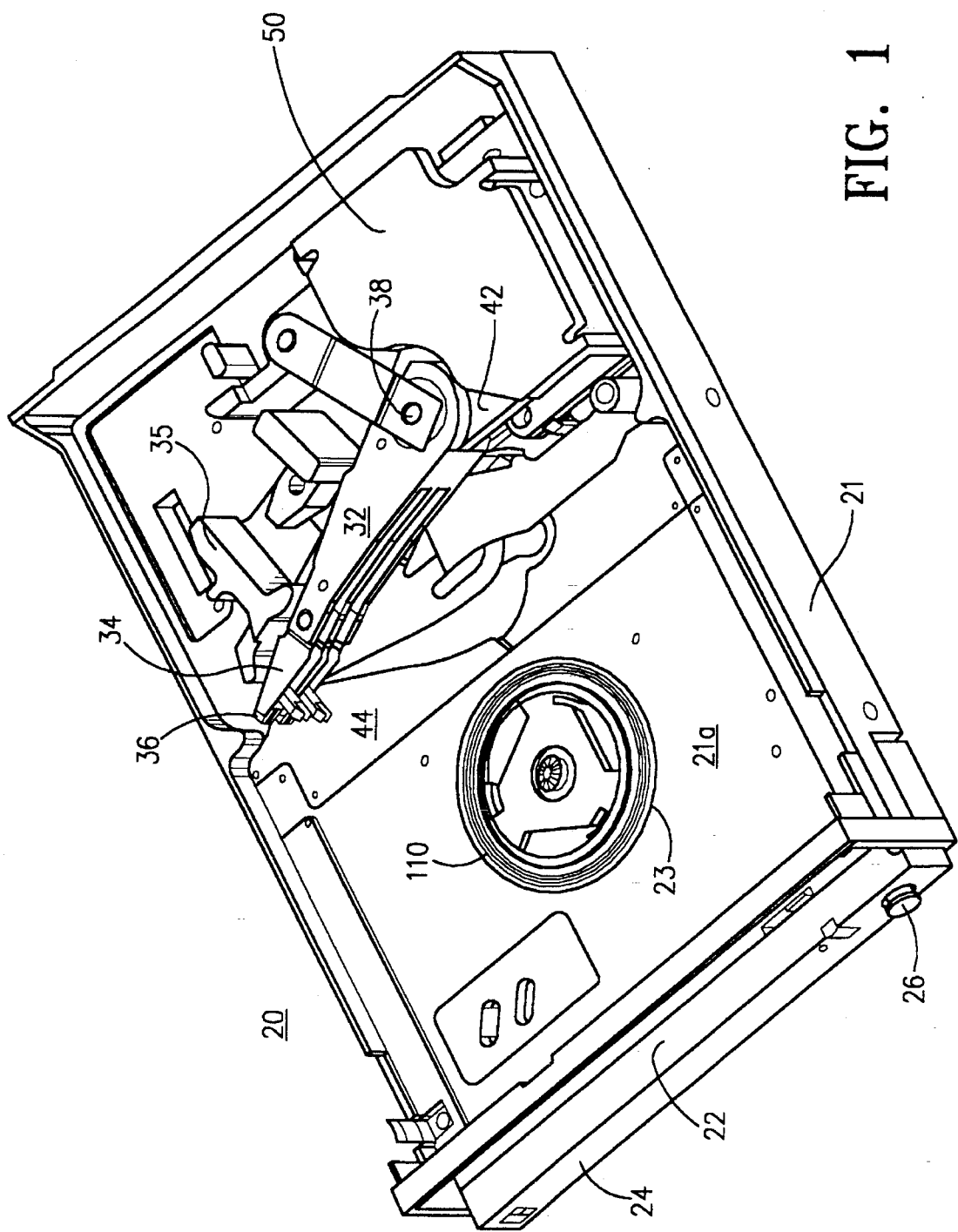
FIG. 1 shows an exemplary disk drive in which the one-piece magnet return path assembly of the present invention may be employed.

Referring to the drawings wherein like numerals indicate like elements throughout, there is shown in FIG. 1 an exemplary disk drive 20 in which the present invention may be employed. The exemplary disk drive 20 is of the type that receives a removable disk cartridge, however, the present invention is by no means limited thereto. For example, the present invention can also be employed in a fixed-disk type drive.

As shown in FIG. 1, the exemplary disk drive 20 comprises a chassis 21 on which a number of disk drive components are mounted. A front panel 24 of the disk drive 20 has a substantially horizontal opening 22 for receiving a removable disk cartridge (not shown). An eject button 26 is provided on the front panel for ejecting a disk cartridge from the disk drive 20. A spindle motor 110 is mounted on the chassis 21 to provide a means for rotating the storage media within a disk cartridge.

An actuator arm 32, which forms part of a radial arm voice coil actuator, is pivotally mounted to the drive chassis 21 at 38. The actuator arm 32 has a plurality of suspension arms 34 at its distal end that each carry a read/write head 36 for recording and reading information to and from the storage media of a disk cartridge (not shown). A head loading mechanism 35 facilitates loading of the magnetic heads onto the storage media. A voice coil element (not shown) is affixed to the other end 42 of the actuator arm 32 for controlling the rotational movement of the arm 32. A magnet return path assembly 50 according to the present invention is mounted to the chassis 21 and provides a magnet return path for the voice coil actuator.

Figure 2:
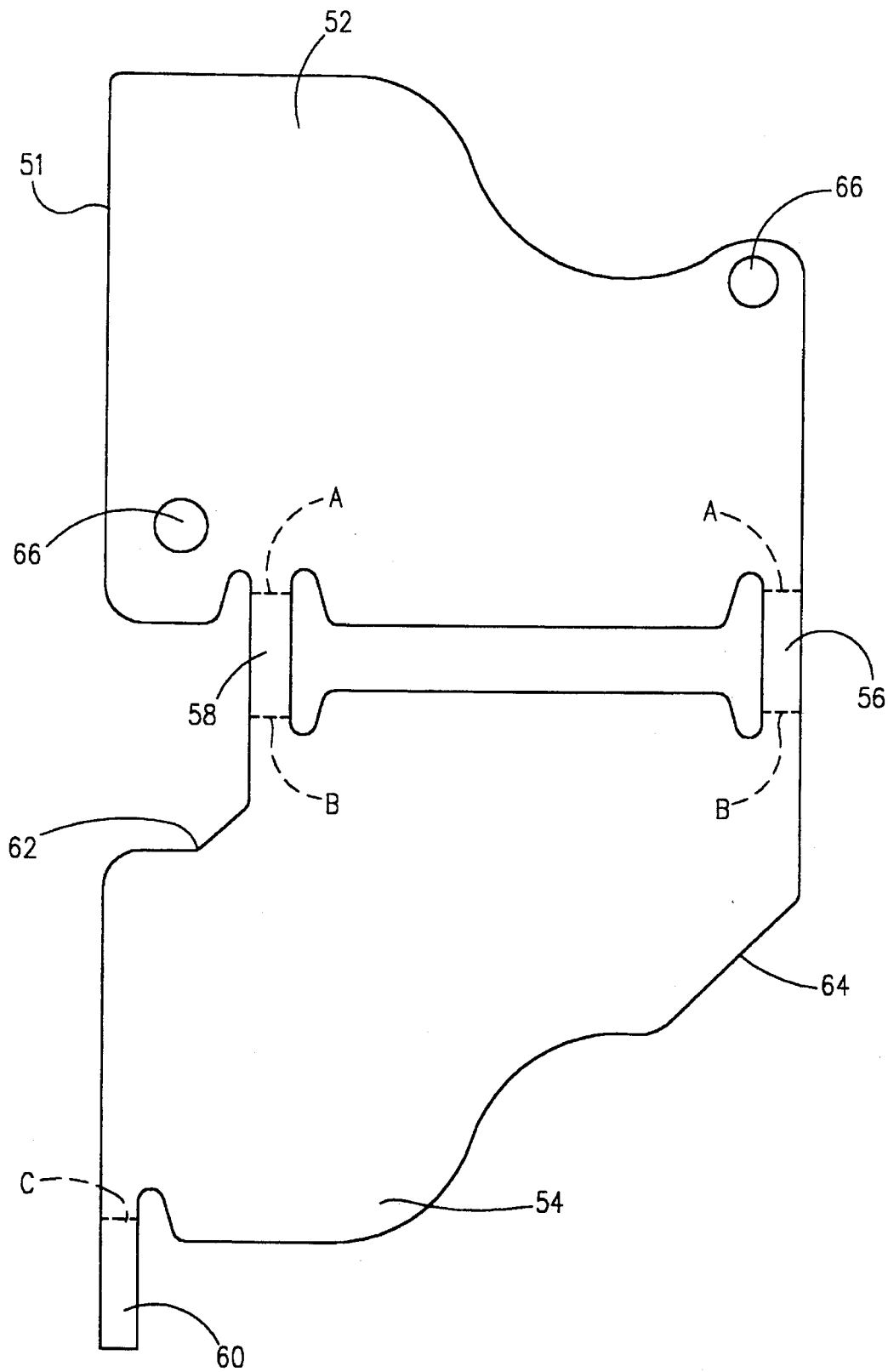
FIG. 2 shows a blank from which the one-piece magnet return path assembly of the present invention may be formed.

FIG. 2 is a plan view of a blank 51 of a one-piece magnet return path assembly in accordance with the present invention. Preferably, the blank 51 is stamped from a single sheet of magnetically permeable material. In the present embodiment, the blank 51 is stamped from a single sheet of low carbon steel (e.g. 1006 steel) having a thickness of approximately 2.5 mm. A finish of zinc chromate may be applied to the steel blank.

The blank comprises a first plate 52, which defines a lower plate of the one-piece magnet return path assembly, and a second plate 54, which defines an upper plate of the return path assembly, as described hereinafter. A plurality of standoffs 56, 58, 60 are formed integrally with the upper and lower plates 52, 54 of the blank 51. In the present embodiment, two of the standoffs 56, 58 extend between the upper and lower plates 52, 54. Mounting holes 66 are formed in the lower plate 52 of the blank 51 to facilitate mounting of the completed assembly in a disk drive. The upper plate has cutaway portions 62, 64 to facilitate access to the mounting holes 66.

Figure 3:
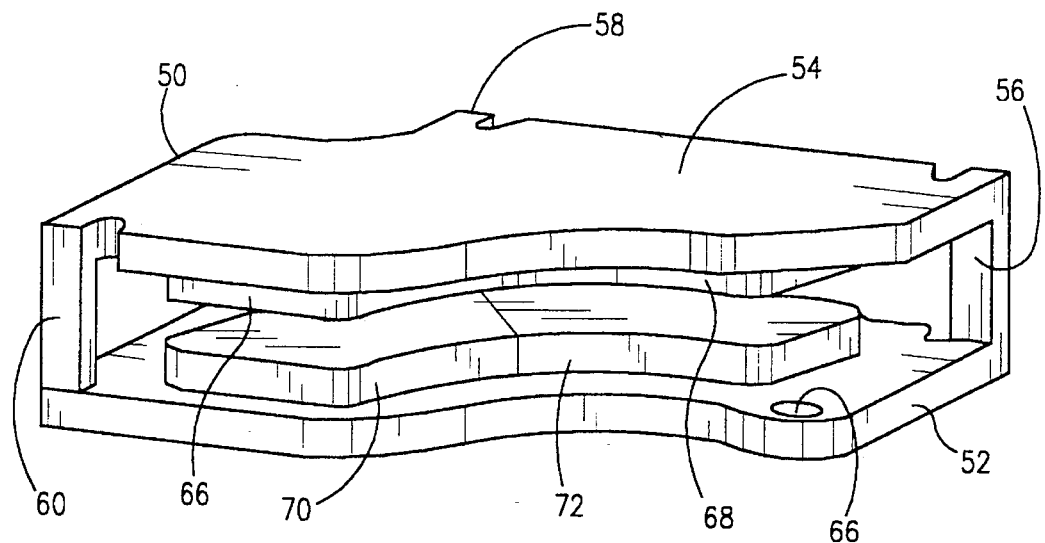
FIG. 3 is a perspective view of the one-piece magnet return path assembly of the present invention.

According to the present invention, the blank 50 is bent in predetermined locations to form the completed one-piece magnet return path assembly of the present invention. More particularly, in the present embodiment, the blank 51 is bent at locations "A", "B" and "C". FIG. 3 illustrates the resulting one-piece magnet return path assembly 50. As shown, the blank 51 is bent at locations "A" and "B" such that the upper and lower plates 52, 54 of the blank 51 are disposed in parallel planes, one above the other. The blank 51 is bent at location "C" to form the third standoff 60. The standoffs 56, 58, 60 extend between the upper and lower plates 52, 54 to establish a predetermined spacing between the plates 52, 54. In the present embodiment, the spacing between the upper and lower plates 52, 54 is approximately 8.0 mm. While three standoffs 56, 58, 60 are employed in the present embodiment to maintain the plate-to-plate spacing, in other embodiments, the number of standoffs can be increased or decreased.

A progressive die can be used to make the necessary bends in the blank 51. For example, the progressive die can be used to bend the lower plate 52 of the blank at locations "A" until the lower plate 52 extends substantially perpendicular to the still planar standoffs 56, 58 and upper plate 54. A second bending step can then serve to bend the upper plate 54 upward at locations "B", until it extends substantially parallel to the lower plate 52. A third bending step can serve to bend the third standoff at location "C" until it extends perpendicularly between the upper and lower plates 52, 54. The various bending steps can be performed in any suitable order.

Figure 4:
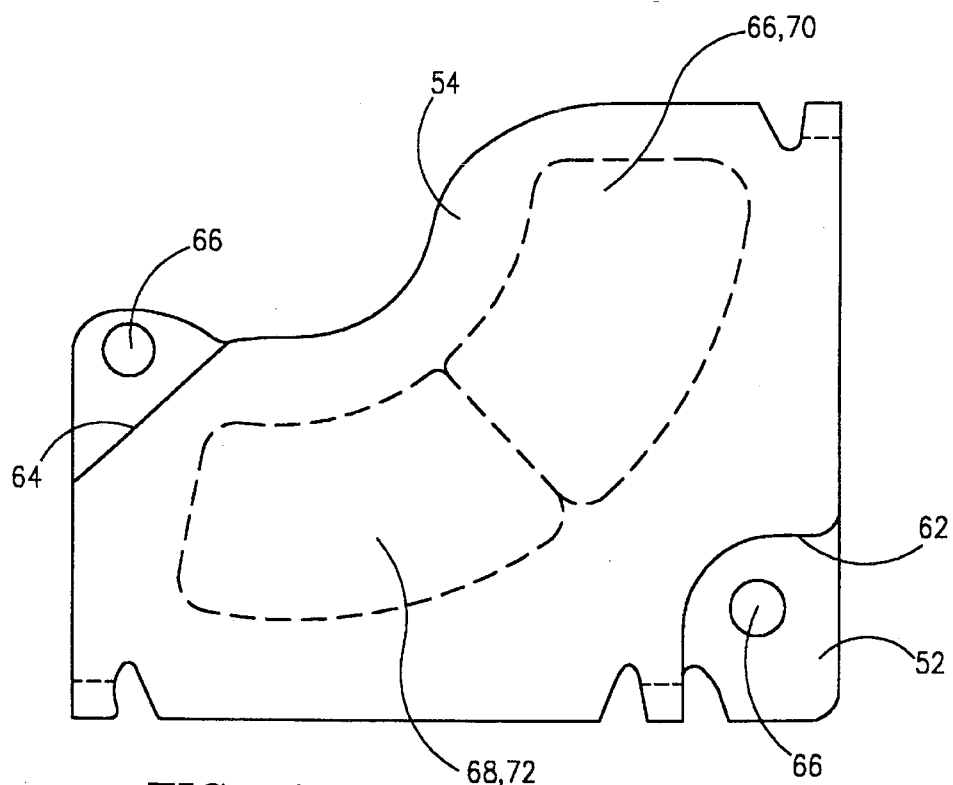
FIG. 4 is a top view of the one-piece magnet return path assembly of the present invention.

A plurality of magnets 66, 68, 70, 72 are affixed to the upper and lower plates in a conventional manner using, for example, an adhesive. FIG. 4 is a top view of the completed one-piece assembly showing the relative placement of the magnets 66, 70 and 68, 72. In the present embodiment, the magnets are approximately 2.5 mm thick, and the resulting air gap between the magnets of the upper and lower plates 52, 54 is approximately 3.0 mm. The gap between the upper and lower magnets receives the coil (not shown) of the disk drive actuator 32 in a conventional manner. As best shown in FIG. 4, the cutaway portions 62, 64 of the upper plate 54 provide access to the mounting holes 66 of the lower plate 52 to facilitate mounting of the assembly 50 in a disk drive.

As the foregoing illustrates, the present invention is directed to a one-piece magnet return path assembly for a disk drive and to a method of making same. The one-piece magnet return path assembly of the present invention reduces costs and simplifies assembly of a disk drive. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A one-piece magnet return path assembly for a disk drive actuator, comprising:

an upper plate;

a lower plate disposed in a plane substantially parallel to a plane of said upper plate; and a plurality of standoffs extending between said upper and lower plates and establishing a pre-determined spacing between said upper and lower plates, said upper and lower plates and said plurality of standoffs being formed integrally from a same piece of magnetically permeable material.

2. The one-piece magnet return path assembly recited in claim 1 wherein said magnetically permeable material comprises a low carbon steel.

3. The one-piece magnet return path assembly recited in claim 1 wherein said plurality of integrally formed standoffs comprises three standoffs.

4. The one-piece magnet return path assembly recited in claim 1 wherein a blank of said magnet return path assembly is stamped from a substantially flat sheet of magnetically permeable material, and the blank is then bent in predetermined locations to form said magnet return path assembly.

5. The one-piece magnet return path assembly recited in claim 1 further comprising a plurality of magnets affixed in opposing relation to the upper and lower plates and having an air gap therebetween.

6. A method of making a magnet return path assembly for a disk drive actuator comprising the steps of:

stamping a one-piece blank from a sheet of magnetically permeable material, said blank having a first plate and a second plate and a plurality of standoffs integrally formed therewith, at least one of said standoffs extending between the first and second plates;

bending said blank in predetermined locations so that said first and second plates are disposed in parallel planes, one above the other, and said standoffs extend between said first and second plates to establish a predetermined spacing between said first and second plates.

7. The method recited in claim 6 wherein said bending step comprises:

bending said blank at a point where said at least one standoff joins said first plate until said first plate extends at substantially a right angle to said at least one standoff;

bending said blank at a point where said at least one standoff joins said second plate until said second plate extends at substantially a right angle to said at least one standoff and parallel to said first plate; and bending said other standoffs at a point where said other standoffs join one of said first and second plates until the standoff extends perpendicularly between said first and second plates.

8. The method recited in claim 6 further comprising the step of attaching a plurality of magnets to the upper and lower plates in opposing relation.

9. The one-piece magnet return path assembly recited in claim 6 wherein said magnetically permeable material comprises a low carbon steel.

10. The one-piece magnet return path assembly recited in claim 6 wherein said plurality of integrally formed standoffs comprises three standoffs.

* * * * *